(12) United States Patent
Chao et al.

(10) Patent No.: US 11,853,997 B2
(45) Date of Patent: Dec. 26, 2023

(54) USING QUICK RESPONSE (QR) CODES TO COLLECT RECURRING PAYMENTS

(71) Applicant: International Business Machines Corporation, Armonk, NY (US)

(72) Inventors: Ching-Yun Chao, Austin, TX (US); John H. Teoh, Durham, NC (US); Frankie Kong, Sheung shui (HK); Xin Ni, DaLian (CN); Randy A. Rendahl, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 16/286,798

(22) Filed: Feb. 27, 2019

(65) Prior Publication Data

US 2020/0273018 A1  Aug. 27, 2020

(51) Int. Cl.
*G06Q 40/00* (2023.01)
*G06Q 20/32* (2012.01)
*G06Q 20/14* (2012.01)
*G06Q 20/36* (2012.01)
*G06K 7/14* (2006.01)

(52) U.S. Cl.
CPC ......... *G06Q 20/3276* (2013.01); *G06Q 20/14* (2013.01); *G06Q 20/36* (2013.01); *G06K 7/1417* (2013.01)

(58) Field of Classification Search
USPC .................. 705/26, 37, 39, 40, 38; 719/328; 717/108; 701/425; 709/226, 246; 726/6, 726/9; 700/245; 235/375, 379
See application file for complete search history.

(56) References Cited

U.S. PATENT DOCUMENTS 7,734,545 B1 * 6/2010 Fogliano ................ G06Q 40/02
705/40
8,494,958 B2 * 7/2013 Schoenberg ......... G06Q 20/102
705/40

(Continued)

OTHER PUBLICATIONS

M-Payment systems: Technologies and business models; 2014 Euro Med Telco Conference (EMTC) (pp. 1-6); Alessandro Vizzarri; Francesco Vatalaro; Nov. 12, 2014. (Year: 2014).*

(Continued)

*Primary Examiner* — Tien C Nguyen
(74) *Attorney, Agent, or Firm* — Stephen J. Walder, Jr.; Jared Chaney

(57) ABSTRACT

Mechanisms are provided to implement a recurring payment collection system for extending current quick response (QR) code payment methods to collect recurring payments from a customer. The recurring payment collection system sends a notification to the customer that a recurring payment is due in response to a recurring payment event occurring. The recurring payment collection system obtains a QR code for the recurring payment in response to the customer acknowledging the notification. The recurring payment collection system utilizes the QR code to request the recurring payment from a payment system. The recurring payment collection system acknowledges that the recurring payment has been made in responsive to the recurring payment being processed by the payment system.

18 Claims, 6 Drawing Sheets

(56) References Cited

U.S. PATENT DOCUMENTS

| | | | |
|---|---|---|---|
| 8,600,884 B2* | 12/2013 | Kim | G06Q 20/102 |
| | | | 705/40 |
| 8,688,576 B2* | 4/2014 | Hanson | G06Q 20/40 |
| | | | 705/40 |
| 9,659,287 B2* | 5/2017 | Moshal | G06Q 30/0633 |
| 9,846,878 B2 | 12/2017 | Kumnick et al. | |
| 10,706,399 B1* | 7/2020 | Desai | G06Q 20/14 |
| 11,025,558 B2* | 6/2021 | Stack | H04L 47/76 |
| 11,392,956 B2* | 7/2022 | Piparsaniya | G06Q 20/14 |
| 2002/0032649 A1* | 3/2002 | Selvarajan | G06Q 20/06 |
| | | | 705/40 |
| 2008/0209534 A1 | 8/2008 | Keronen et al. | |
| 2010/0299230 A1* | 11/2010 | Patterson | G06Q 20/10 |
| | | | 705/30 |
| 2013/0212004 A1 | 8/2013 | Itwaru | |
| 2013/0219516 A1 | 8/2013 | Shimshoni | |
| 2014/0081784 A1 | 3/2014 | Ahn | |
| 2014/0279204 A1* | 9/2014 | Roketenetz | G06Q 30/0631 |
| | | | 705/26.7 |
| 2016/0098746 A1 | 4/2016 | Lewis et al. | |
| 2016/0180302 A1* | 6/2016 | Bagot, Jr. | G06Q 20/102 |
| | | | 705/40 |
| 2017/0221066 A1* | 8/2017 | Ledford | G06Q 20/4016 |
| 2017/0364880 A1* | 12/2017 | Malhotra | G06Q 20/102 |
| 2018/0260806 A1* | 9/2018 | Bhuma | G06Q 20/3226 |
| 2019/0197501 A1* | 6/2019 | Senci | G06Q 20/3223 |
| 2020/0118133 A1* | 4/2020 | Schmidt | G06Q 20/102 |

OTHER PUBLICATIONS

"Guide To Understanding the E-Commerce Market in China", https://www.marketingtochina.com/guide-understanding-e-commerce-market-china/, Mar. 5, 2018, 18 pages.

Anonymously, "Payment Methods Supported by the Sources API" https://stripe.com/docs/sources, Downloaded from the Internet on Jan. 8, 2019, 5 pages.

Marszalek, Wiktoria, "Online Payments in China—A Guide for Foreign Companies", https://www.nanjingmarketinggroup.com/blog/china-online-payments, Nov. 16, 2017, 10 pages.

Wikipedia, "Alipay", https://en.wikipedia.org/wiki/Alipay, Downloaded from the internet on Jan. 7, 2019, 6 pages.

Wikipedia, "WeChat", https://en.wikipedia.org/wiki/WeChat#WeChat_Pay_payment_services, Downloaded from the Internet on Jan. 7, 2019, 19 pages.

* cited by examiner

US 11,853,997 B2

USING QUICK RESPONSE (QR) CODES TO COLLECT RECURRING PAYMENTS

BACKGROUND

The present application relates generally to an improved data processing apparatus and method and more specifically to mechanisms for collecting recurring payments using quick response (QR) codes.

Alipay™ and TenPay™ (WeChat Pay™) are the two most popular online and mobile payment methods in China. Alipay™ took 55% of the third-party mobile payment market share with TenPay™ taking 39.8% and other payment companies having a share of the remaining 5.2%. Alipay™ is used in smartphones with their Alipay Wallet app. QR code payments are used for local in-store payments. WeChat Pay is a digital wallet service incorporated into WeChat™, which allows users to perform mobile payments and send money between contacts. WeChat™ has used its strengths to develop a systematic marketing platform around QR codes. Users may scan QR codes to add each other as friends, or to link users to the official product teams for certain brands. WeChat™ QR codes provide a way for the offline physical product to link to the digital market. In China, digital marketing around the QR code is an environmental feature of some international cities, such as Guangzhou, Shanghai, and Beijing.

China is not only the largest E-Commerce market in the world but also undoubtedly the most exciting, innovative & unique in the world. According to Statista's latest report, online sales in Business to consumer (B2C) e-retail reached the US $499,150 billion, up from $403,458 billion in 2016. China digital market is bound for future growth considering continued Gross domestic product (GDP) growth of 6.9% in 2017.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising a processor and a memory, the memory comprising instructions that are executed by the processor to configure the processor to implement a recurring payment collection system for extending current quick response (QR) code payment methods to collect recurring payments from a customer. The method comprises sending, by the recurring payment collection system, a notification to the customer that a recurring payment is due in response to a recurring payment event occurring. The method also comprises obtaining, by the recurring payment collection system, a QR code for the recurring payment in response to the customer acknowledging the notification. Moreover, the method comprises utilizing, by the recurring payment collection system, the QR code to request the recurring payment from a payment system. The method also comprises acknowledging, by recurring payment collection system, that the recurring payment has been made in response to the recurring payment being processed by the payment system.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
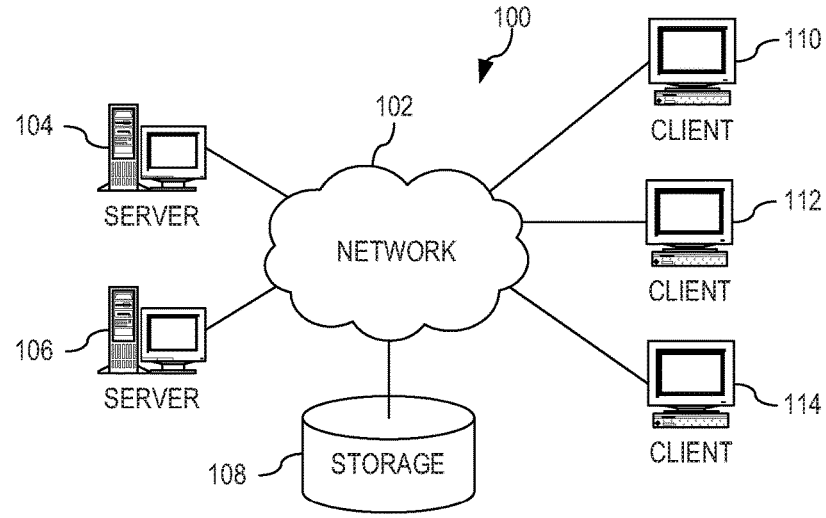
FIG. 1 is an example diagram of a distributed data processing system in which aspects of the illustrative embodiments may be implemented.

As stated previously, quick response (QR) code payments are commonly used for local in-store payments, mobile payments, and send money between contacts. Users may scan QR codes to add each other as friend, or to link users to the official product teams for certain brands thereby providing a way for the offline physical product to link to the digital market. Global enterprises, such as IBM® and others, are working hard to expand into E-Commerce marketplace. Thus, supporting the dominating online and mobile payment systems, hereinafter referred to as payment systems, is of critical importance. However, while current online and mobile payment systems support merchants to collect a one-time charge from customers using QR code, these current payment systems are not open to support the collection of recurring payments from customers.

The illustrative embodiments provide for extending current QR code payment methods to collect recurring payments from customers. In one embodiment, when a customer's subscription term is up for renewal, the mechanisms of the illustrative embodiments provide for sending a message, such as a Short Message Service (SMS) message, Multimedia Messaging Service (MMS) message, email message, or the like, to the customer. The customer may select a Uniform Resource Locator (URL) link in the message to access the merchant's web site to scan a merchant QR code to pay the renewal fee. The funds will be transferred to the merchant's bank account which completes the payment processing. In another embodiment, a merchant app is used in the alternative payment flow. After receiving the message, the customer opens a digital wallet to access the customer's QR code. The customer then shares the QR code with merchant app which transmits the QR code to the merchant's server. The merchant then requests payment through a payment system which completes the payment processing.

Furthermore, in this manner, the functionality or capability of computing systems is improved by extending current QR code payment methods to collect recurring payments from customers. By providing for recurring payments using QR codes, the computing system provides an improved payment system that was not openly available prior to this invention. Furthermore, the present invention improves the technology or technical field involving software development. As discussed above, current payment systems are not open to support the collection of recurring payments from customers. The mechanisms of the illustrative embodiment provide the means for extending current QR code payment methods to collect recurring payments from customers thereby improves such technology by creating a specifically configured computing system that collects recurring payments from customers using QR code payment methods. In this manner, there is an improvement to the technology or technical field involving software development. The technical solution provided by the present invention cannot be performed in the human mind or by a human using a pen and paper. That is, the technical solution provided by the present invention could not be accomplished in the human mind or by a human using a pen and paper in any reasonable amount of time and with any reasonable expectation of accuracy without, the use of a computer.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
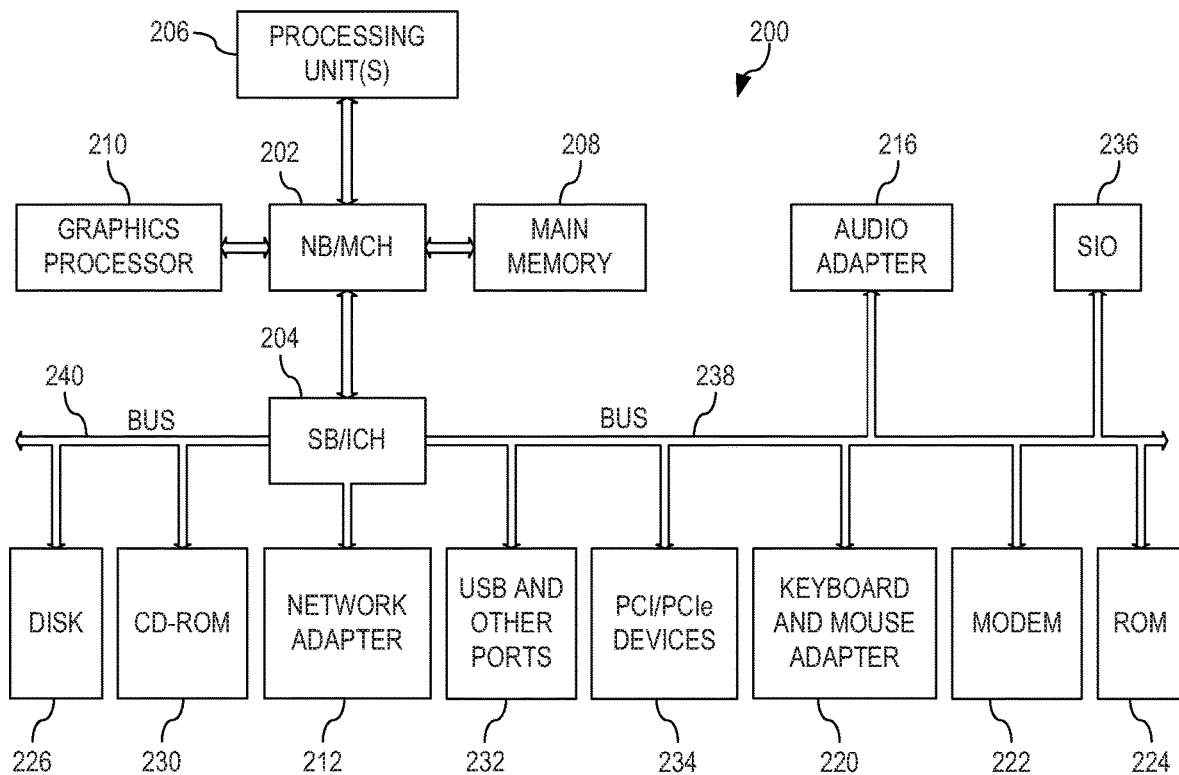
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a recurring payment collection mechanism using quick response (QR) codes. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates collecting recurring payments using quick response (QR) codes.

As noted above, the mechanisms of the illustrative embodiments utilize specifically configured computing devices, or data processing systems, to perform the operations for collecting recurring payments using quick response (QR) codes. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the recurring payment collection mechanism using quick response (QR) codes.

Those of ordinary skill in the art will appreciate that the hardware in FIGS. 1 and 2 may vary depending on the implementation. Other internal hardware or peripheral devices, such as flash memory, equivalent non-volatile memory, Or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
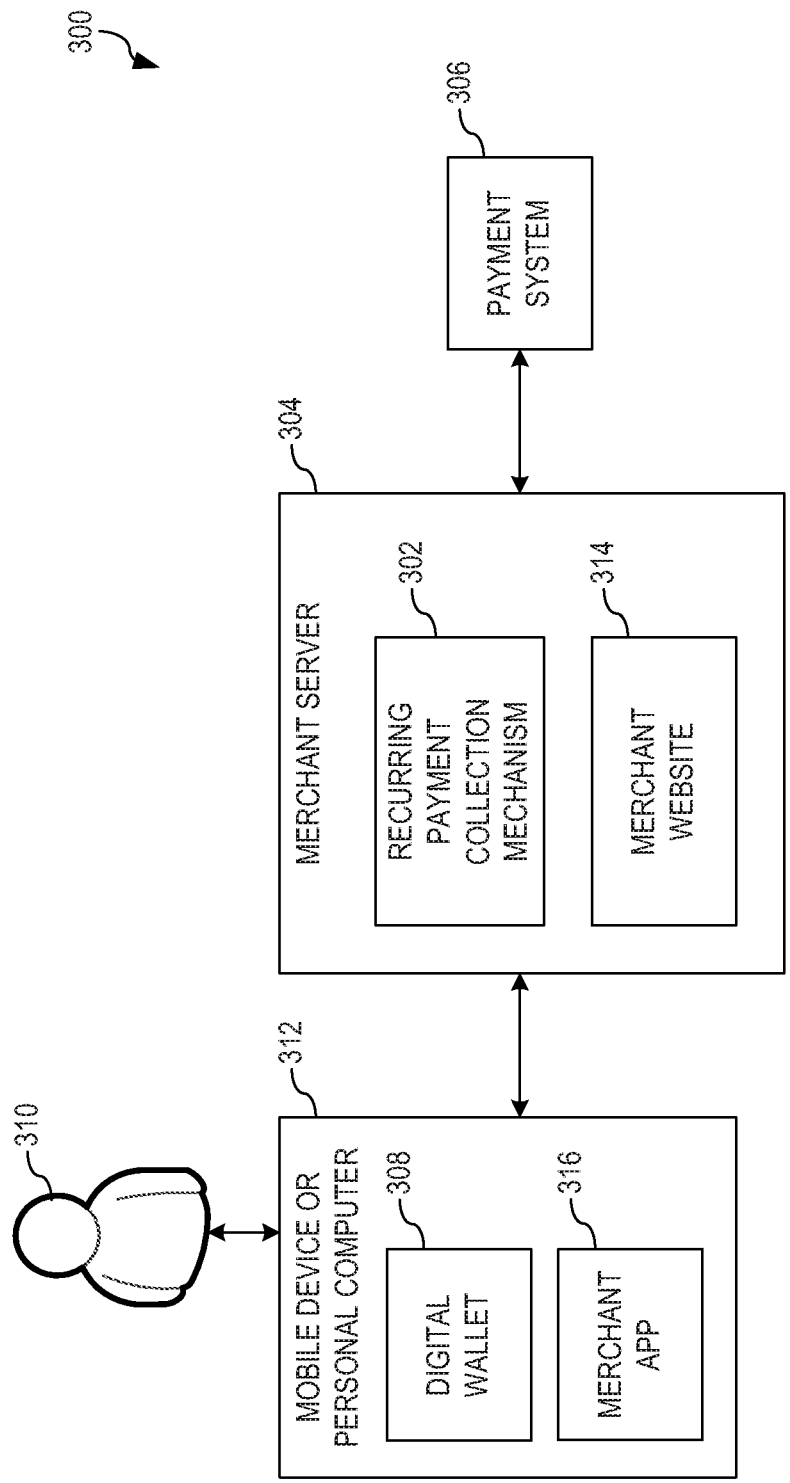
FIG. 3 depicts a functional block diagram a recurring payment collection mechanism in accordance with one illustrative embodiment.

Again, the illustrative embodiments provide for extending current quick response (QR) code payment methods to collect recurring payments from customers. FIG. 3 depicts a functional block diagram a recurring payment collection mechanism in accordance with one illustrative embodiment. Data processing system 300 comprises recurring payment collection mechanism 302 that is part of merchant server 304. Recurring payment collection mechanism 302 is further coupled to a payment system 306 through which payments are conducted as well as a customer's digital wallet 308 through which the customer 310 may make initial payments as well recurring payments. In each of the three embodiments of the invention that will be discussed hereafter, the initial interaction between customer 310 and the merchant website 314 executing on merchant server 304 or a merchant app 316 executing on mobile device or personal computer 312 and coupled to merchant server 304 is the same. Therefore, in the initial interaction with the merchant, whether online or in a physical store, customer 310 accesses the merchant website 314 or the merchant app 316 when customer 310 is ready to checkout, i.e. pay for goods or services that customer 310 wants to purchase. As part of the checkout process, recurring payment collection mechanism 302 executing on merchant server 304 presents multiple payment methods, one of which is a QR code payment method. Responsive to customer 310 selecting the QR code as the payment method, recurring payment collection mechanism 302 requests a unique merchant QR code for customer 310 in the checkout amount from payment system 306. Once payment system 306 provides the unique merchant QR code to recurring payment collection mechanism 302, recurring payment collection mechanism 302 posts the unique merchant QR code on the merchant website 314 or merchant app 316. Utilizing mobile device or personal computer 312, customer 310 scans, captures, or otherwise acknowledges, the unique merchant QR code into digital wallet 308 to authorize the payment for the goods or services. Upon authorizing the payment, digital wallet 308 sends the authorization to recurring payment collection mechanism 302. Upon receiving the authorizing of the payment, recurring payment collection mechanism 302 establishes the recurring payments for the goods or services and, in one embodiment, recurring payment collection mechanism 302 sends to payment system 306. In another embodiment, digital wallet 308 could send the authorization directly to payment system 306. Once payment system 306 receives the authorization, payment system 306 releases the agreed amount to recurring payment collection mechanism 302 and sends a confirmation to digital wallet 308. Once recurring payment collection mechanism 302 receives the payment, recurring payment collection mechanism 302 establishes the recurring payments for the goods or services.

In accordance with one embodiment of the illustrative embodiments, in order to extend the initial QR code payment method to collect recurring payments from customer 310, when a recurring payment is due, recurring payment collection mechanism 302 sends a notification, such as a Short Message Service (SMS) message, Multimedia Messaging Service (MMS) message, email message, or the like, to customer 310 to return to the merchant website 314 executing on merchant server 304 to make the recurring payment. Using mobile device or personal computer 312, customer 310 accesses recurring payment collection mechanism 302 and requests a merchant QR code for making the recurring payment. Recurring payment collection mechanism 302 requests a unique merchant QR code for customer 310 in the recurring payment amount from payment system 306. Once payment system 306 provides the unique merchant QR code to recurring payment collection mechanism 302, recurring payment collection mechanism 302 posts the unique merchant QR code on the merchant website 314 executing on merchant server 304. Utilizing mobile device or personal computer 312, customer 310 scans, captures, or otherwise acknowledges, the unique merchant QR code into digital wallet 308 to authorize the payment for the goods or services. Upon authorizing the payment, digital wallet 308 sends the authorization to recurring payment collection mechanism 302 that, in one embodiment, recurring payment collection mechanism 302 sends to payment system 306. In another embodiment, digital wallet 308 could send the authorization directly to payment system 306. Once payment system 306 receives the authorization, payment system 306 releases the agreed amount to recurring payment collection mechanism 302 and sends a confirmation to digital wallet 308.

In accordance with another embodiment of the illustrative embodiments, in order to extend the initial QR code payment method to collect recurring payments from customer 310, when a recurring payment is due, recurring payment collection mechanism 302 sends a notification, such as a Short Message Service (SMS) message, Multimedia Messaging Service (MMS) message, email message, or the like, to customer 310. Using mobile device or personal computer 312, customer 310 accesses a merchant app 316 executing on mobile device or personal computer 312 and coupled to merchant server 304. Different from the previous embodiment, upon accessing merchant app, recurring payment collection mechanism 302 detects the access and requests a unique merchant QR code in the recurring payment amount from payment system 306. Once payment system 306 provides the unique merchant QR code to recurring payment collection mechanism 302, recurring payment collection mechanism 302 relays the unique merchant QR code to customer 310 on mobile device or personal computer 312. Utilizing mobile device or personal computer 312, customer 310 scans, captures, or otherwise acknowledges, the unique merchant QR code into digital wallet 308 to authorize the payment for the goods or services. Upon authorizing the payment, digital wallet 308 sends the authorization to recurring payment collection mechanism 302 that, in one embodiment, recurring payment collection mechanism 302 sends to payment system 306. In another embodiment, digital wallet 308 could send the authorization directly to payment system 306. Once payment system 306 receives the authorization, payment system 306 releases the agreed amount to recurring payment collection mechanism 302 and sends a confirmation to digital wallet 308.

In accordance with yet another embodiment of the illustrative embodiments, in order to extend the initial QR code payment method to collect recurring payments from customer 310, when a recurring payment is due, recurring payment collection mechanism 302 sends a notification, such as a Short Message Service (SMS) message, Multimedia Messaging Service (MMS) message, email message, or the like, to customer 310. Using mobile device or personal computer 312, customer 310 accesses digital wallet 308. Different from the previous embodiments, upon accessing digital wallet 308, digital wallet 308 generates a unique customer QR code in the recurring payment amount. Digital wallet 308 shares the unique customer QR code with merchant app 316 and recurring payment collection mechanism 302. Recurring payment collection mechanism 302 relays the unique customer QR code and a payment request to payment system 306. Upon receiving the unique customer QR code and the payment request, payment system 306 sends a payment authorization request directly to digital wallet 308 to authorize the payment for the goods or services. Upon authorizing the payment, digital wallet 308 sends the authorization directly to payment system 306. Once payment system 306 receives the authorization, payment system 306 releases the agreed amount to recurring payment collection mechanism 302 and sends a confirmation to digital wallet 308.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
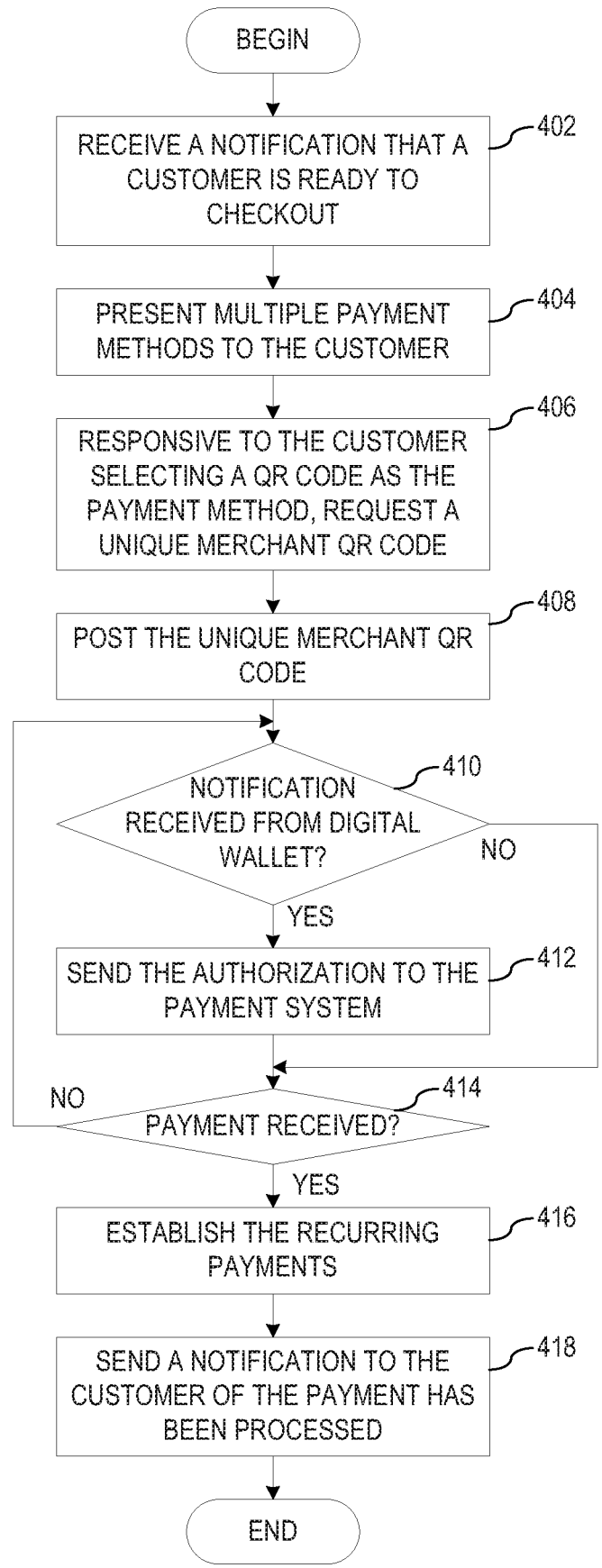
FIG. 4 depicts an exemplary functional block diagram of the operation performed by a recurring payment collection mechanism in collecting an initial payment for services or goods in accordance with one illustrative embodiment.

FIG. 4 depicts an exemplary functional block diagram of the operation performed by a recurring payment collection mechanism in collecting an initial payment for services or goods in accordance with one illustrative embodiment. As the operation begins, the recurring payment collection mechanism receives a notification that a customer is ready to checkout, i.e. pay for goods or services (step 402). The recurring payment collection mechanism presents multiple payment methods, one of which is a QR code payment method, to the customer via the customer's mobile device, personal computer, or the like (step 404), Responsive to receiving the customer's selection of the QR code as the payment method, the recurring payment collection mechanism requests a unique merchant QR code for the customer in the checkout amount from a payment system (step 406). Responsive to receiving the unique merchant QR code from the payment system, the recurring payment collection mechanism posts the unique merchant QR code on the merchant website or merchant app (step 408). Utilizing the mobile device, personal computer, or the like, the customer scans, captures, or otherwise acknowledges, the unique merchant QR code into the customer's digital wallet to authorize the payment for the goods or services, which the digital wallet may send either to the recurring payment collection mechanism or the payment system. Thus, the recurring payment collection mechanism determines whether the notification is received from the digital wallet (step 410). If at step 410 the recurring payment collection mechanism receives a notification of authorization from the digital wallet, the recurring payment collection mechanism sends the authorization to the payment system (step 412). From step 412 or if at step 410 no notification is received, then the recurring payment collection mechanism waits for payment from the payment system (step 414). If at step 414 no payment is received, the operation returns to step 410. If at step 414 the recurring payment collection mechanism receives a payment from the payment system, the recurring payment collection mechanism establishes the recurring payments for the goods or services (step 416) and sends a notification to the customer via the customer's mobile device, personal computer, or the like, that the payment has been processed (step 420), with the operation ending thereafter. It is noted that the payment system may also notify the user that the payment has been processed.

Figure 5:
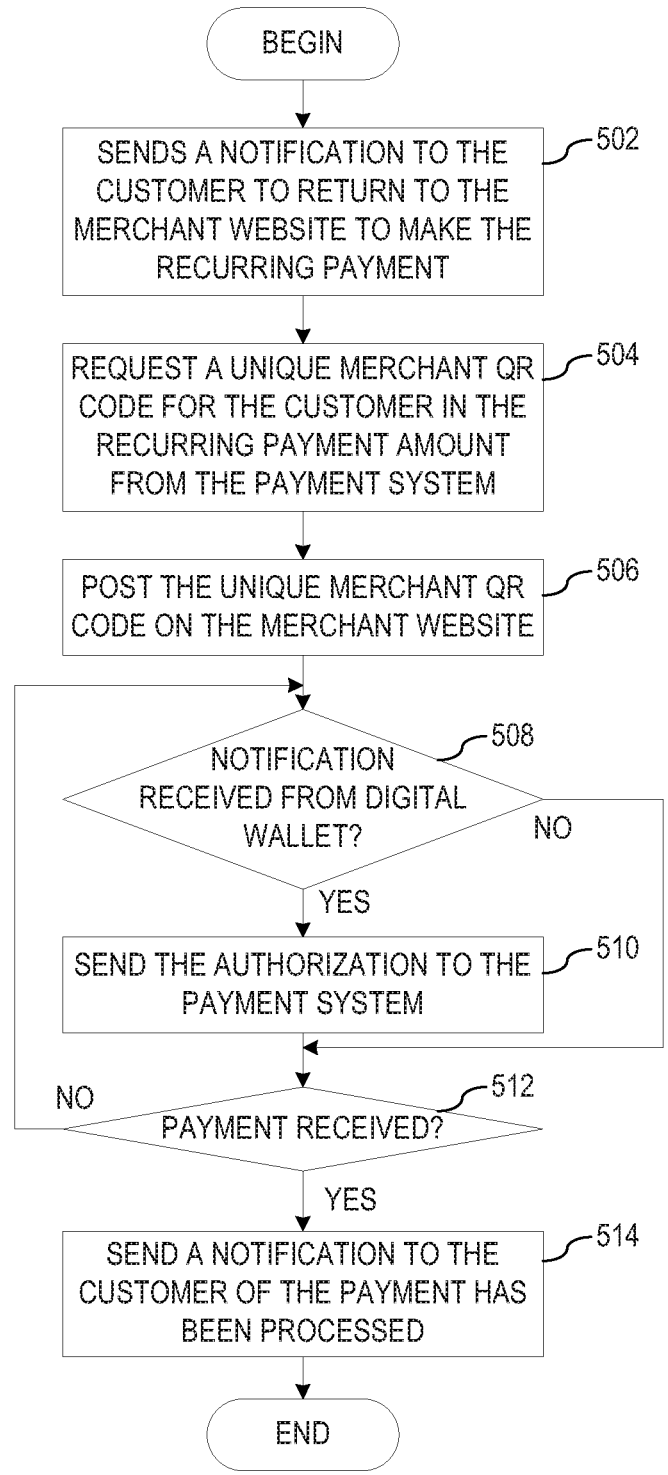
FIG. 5 depicts one exemplary functional block diagram of the operation performed by a recurring payment collection mechanism in collecting a recurring payment using quick response (QR) codes in accordance with one illustrative embodiment.

FIG. 5 depicts one exemplary functional block diagram of the operation performed by a recurring payment collection mechanism in collecting a recurring payment using quick response (QR) codes in accordance with one illustrative embodiment. As the operation begins, when a recurring payment is due, the recurring payment collection mechanism sends a notification, such as a Short Message Service (SMS) message, Multimedia Messaging Service (MMS) message, email message, or the like, to the customer to return to the merchant website executing on merchant server to make the recurring payment (step 502). Responsive to the customer accessing the merchant website executing on merchant server and requesting a merchant QR code for making the recurring payment, the recurring payment collection mechanism requests a unique merchant QR code for the customer in the recurring payment amount from the payment system (step 504). Responsive to receiving the unique merchant QR code from the payment system, the recurring payment collection mechanism posts the unique merchant QR code on the merchant website executing on merchant server (step 506). Utilizing the mobile device, personal computer, or the like, the customer scans, captures, or otherwise acknowledges, the unique merchant QR code into the customer's digital wallet to authorize the recurring payment for the goods or services, which the digital wallet may send either to the recurring payment collection mechanism or the payment system. Thus, the recurring payment collection mechanism determines whether the notification is received from the digital wallet (step 508). If at step 508 the recurring payment collection mechanism receives a notification of authorization from the digital wallet, the recurring payment collection mechanism sends the authorization to the payment system (step 510). From step 510 or if at step 508 no notification is received, the recurring payment collection mechanism then waits for payment from the payment system (step 512). If at step 512 no payment is received, then the operation returns to step 508. If at step 512 the recurring payment collection mechanism receives a payment from the payment system, the recurring payment collection mechanism sends a notification to the customer via the customer's mobile device, personal computer, or the like, that the payment has been processed (step 514), with the operation ending thereafter. It is noted that the payment system may also notify the user that the payment has been processed.

Figure 6:
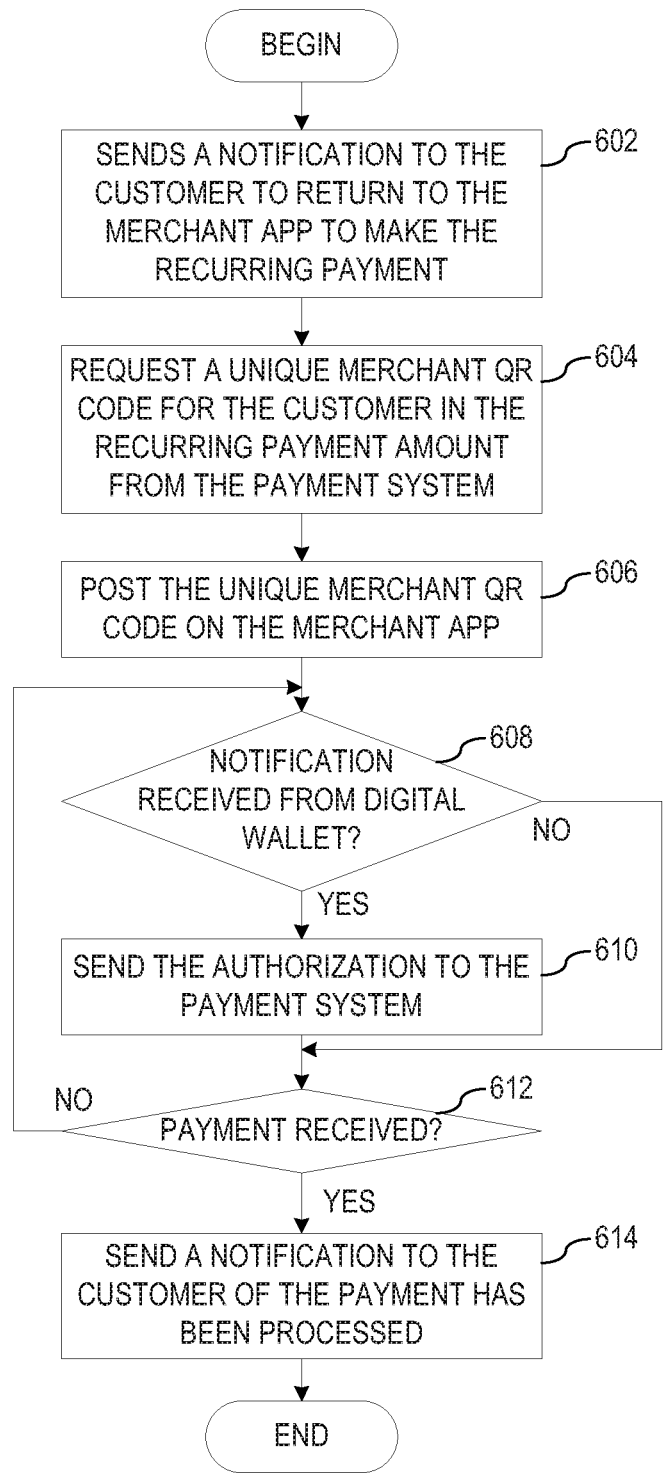
FIG. 6 depicts another exemplary functional block diagram of the operation performed by a recurring payment collection mechanism in collecting a recurring payment using quick response (QR) codes in accordance with one illustrative embodiment.

FIG. 6 depicts another exemplary functional block diagram of the operation performed by a recurring payment collection mechanism in collecting a recurring payment using quick response (QR) codes in accordance with one illustrative embodiment. As the operation begins, when a recurring payment is due, the recurring payment collection mechanism sends a notification, such as a Short Message Service (SMS) message, Multimedia Messaging Service (MMS) message, email message, or the like, to the customer (step 602). Using the customer's mobile device or personal computer, the customer accesses a merchant app executing on the customer mobile device or personal computer and coupled to the merchant server. Responsive to detecting the access, the recurring payment collection mechanism requests a unique merchant QR code in the recurring payment amount from the payment system (step 604). Responsive to the payment system providing the unique merchant QR code, the recurring payment collection mechanism posts the unique merchant QR code to the merchant app for the customer via mobile device or personal computer (step 606). Utilizing the mobile device, personal computer, or the like, the customer scans, captures, or otherwise acknowledges, the unique merchant QR code into the customer's digital wallet to authorize the recurring payment for the goods or services, which the digital wallet may send either to the recurring payment collection mechanism or the payment system. Thus, the recurring payment collection mechanism determines whether the notification is received from the digital wallet or the payment system (step 608). If at step 608 the recurring payment collection mechanism receives a notification of authorization from the digital wallet, the recurring payment collection mechanism sends the authorization to the payment system (step 610). From step 610 or if at step 608 no notification is received, the recurring payment collection mechanism waits for payment from the payment system (step 612). If at step 612 no payment is received, then the operation returns to step 508. From step 612 the recurring payment collection mechanism receives a payment from the payment system, the recurring payment collection mechanism sends a notification to the customer via the customer's mobile device, personal computer, or the like, that the payment has been processed (step 614), with the operation ending thereafter. It is noted that the payment system may also notify the user that the payment has been processed.

Figure 7:
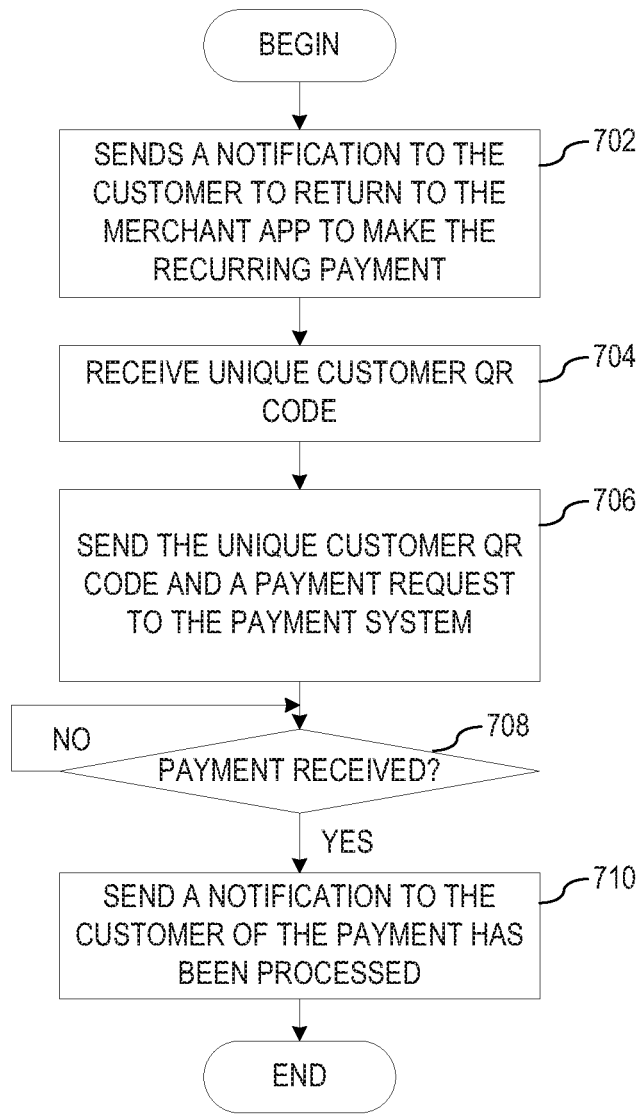
FIG. 7 depicts yet another exemplary functional block diagram of the operation performed by a recurring payment collection mechanism in collecting a recurring payment using quick response (QR) codes in accordance with one illustrative embodiment.

FIG. 7 depicts yet another exemplary functional block diagram of the operation performed by a recurring payment collection mechanism in collecting a recurring payment using quick response (QR) codes in accordance with one illustrative embodiment. As the operation begins, when a recurring payment is due, the recurring payment collection mechanism sends a notification, such as a Short Message Service (SMS) message, Multimedia Messaging Service (MMS) message, email message, or the like, to the customer (step 702). Using the customer's mobile device or personal computer, the customer accesses the digital wallet on the customer's mobile device or personal computer and, upon accessing digital wallet, the digital wallet generates a unique customer QR code in the recurring payment amount, which the digital wallet shares with the merchant app and the recurring payment collection mechanism. Thus, the recurring payment collection mechanism receives the unique customer QR code (step 704) and sends the unique customer QR code and a payment request to the payment system (step 706). Upon receiving the unique customer QR code and the payment request, the payment system sends a payment authorization request directly to the customer's digital wallet to authorize the payment for the goods or services at which time the customer' authorizes back to the payment system. Thus, the recurring payment collection mechanism then waits for payment from the payment system (step 708). If at step 708 no payment is received, then the operation returns to step 708. If at step 708 the recurring payment collection mechanism receives a payment from the payment system, the recurring payment collection mechanism sends a notification to the customer via the customer's mobile device, personal computer, or the like, that the payment has been processed (step 710), with the operation ending thereafter. It is noted that the payment system may also notify the user that the payment has been processed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for extending current QR code payment methods to collect recurring payments from customers. In one embodiment, when a customer's subscription term is up for renewal, the mechanisms of the illustrative embodiments provide for sending a message, such as a Short Message Service (SMS) message, Multimedia Messaging Service (MMS) message, email message, or the like, to the customer. The customer may select a Uniform Resource Locator (URL) link in the message to access the merchant's web site to scan a merchant QR code to pay the renewal fee. The funds will be transferred to the merchant's bank account which completes the payment processing. In another embodiment, a merchant app is used in the alternative payment flow. After receiving the message, the customer opens a digital wallet to access the customer's QR code. The customer then shares the QR code with merchant app which transmits the QR code to the merchant's server. The merchant then requests payment through a payment system which completes the payment processing.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, comprising:
   responsive to a recurring payment event occurring, sending, by a recurring payment collection system of the data processing system, a notification to a computing device of the customer that a recurring payment is due;
   responsive to receiving a customer input to a digital wallet executing on the computing device and acknowledging the notification via the digital wallet executing on the computing device, generating, by the digital wallet, a quick response (QR) code for the recurring payment from a payment system, at least by encoding customer specific information and the recurring payment amount in a computer interpretable graphical pattern of the QR code;
   providing, by the digital wallet, the QR code to the recurring payment collection system;
   processing, by the recurring payment collection system, the QR code to request the recurring payment from the payment system;
   in response to the digital wallet receiving a request from the payment system, processing, by the digital wallet, the QR code to interpret the computer interpretable graphical pattern of the QR code for authorizing the payment system to perform the recurring payment based on the customer specific information and the recurring payment amount encoded in the QR code; and
   responsive to the recurring payment being processed by the payment system in response to the authorization from the digital wallet, acknowledging, by recurring payment collection system, that the recurring payment has been made.

2. The method of claim 1, wherein the digital wallet provides the QR code to a merchant application executing on the computing device of the customer.

3. The method of claim 1, wherein the QR code is obtained responsive to the customer accessing a merchant app on the customer device in response to receiving the notification and wherein the QR code is posted on the merchant app for the customer's utilization.

4. The method of claim 1, wherein the recurring payment is established as part of an initial payment.

5. The method of claim 1, wherein the recurring payment collection system sends a notification to the customer when the payment has been processed.

6. The method of claim 1, wherein the notification is one of a Short Message Service (SMS) message, a Multimedia Messaging Service (MMS) message, or an email message.

7. A computer program product comprising a computer readable storage medium having a computer readable program stored therein, wherein the computer readable program, when executed on a data processing system, causes the data processing system to:
   send, by a recurring payment collection system of the data processing system, responsive to a recurring payment event occurring, a notification to a computing device of the customer that a recurring payment is due;
   generate, by the digital wallet, responsive to receiving a customer input to a digital wallet executing on the computing device and acknowledging the notification via the digital wallet executing on the computing device, a quick response (QR) code for the recurring payment from a payment system at least by encoding customer specific information and the recurring payment amount in a computer interpretable graphical pattern of the QR code;
   provide, by the digital wallet, the QR code to the recurring payment collection system;
   process, by the recurring payment collection system, the QR code to request the recurring payment from the payment system, wherein the QR code encodes merchant specific information, corresponding to the merchant, in a computer interpretable visual representation and is processed by the recurring payment collection system to interpret the QR code and identify the merchant specific information about the merchant in order to perform recurring payment processing;
   process, by the digital wallet, in response to the digital wallet receiving a request from the payment system, the QR code to interpret the computer interpretable graphical pattern of the QR code for authorizing the payment system to perform the recurring payment based on the customer specific information and the recurring payment amount encoded in the QR code; and
   acknowledge, by the recurring payment collection system, responsive to the recurring payment being processed by the payment system, that the recurring payment has been made.

8. The computer program product of claim 7, wherein the digital wallet provides the QR code to a merchant application executing on the computing device of the customer.

9. The computer program product of claim 7, wherein the computer readable program to obtain the QR code is responsive to the customer accessing a merchant app on the customer device in response to receiving the notification and wherein the QR code is posted on the merchant app for the customer's utilization.

10. The computer program product of claim 7, wherein the recurring payment is established as part of an initial payment.

11. The computer program product of claim 7, wherein the recurring payment collection system sends a notification to the customer when the payment has been processed.

12. The computer program product of claim 7, wherein the notification is one of a Short Message Service (SMS) message, a Multimedia Messaging Service (MMS) message, or an email message.

13. An apparatus comprising:
at least one processor; and
at least one memory coupled to the at least one processor, wherein the at least one memory comprises instructions which, when executed by the at least one processor, cause the at least one processor to:
send, by a recurring payment collection system of the data processing system, responsive to a recurring payment event occurring, a notification to a computing device of the customer that a recurring payment is due;
generate, by the digital wallet, responsive to receiving a customer input to a digital wallet executing on the computing device and acknowledging the notification via the digital wallet executing on the computing device, a quick response (QR) code for the recurring payment from a payment system, at least by encoding customer specific information and the recurring payment amount in a computer interpretable graphical pattern of the QR code;
provide, by the digital wallet, the QR code to the recurring payment collection system;
process, by the recurring payment collection system, the QR code to request the recurring payment from the payment system, wherein the QR code encodes merchant specific information, corresponding to the merchant, in a computer interpretable visual representation and is processed by the recurring payment collection system to interpret the QR code and identify the merchant specific information about the merchant in order to perform recurring payment processing;
process, by the digital wallet, in response to the digital wallet receiving a request from the payment system, the QR code to interpret the computer interpretable graphical pattern of the QR code for authorizing the payment system to perform the recurring payment based on the customer specific information and the recurring payment amount encoded in the QR code; and
acknowledge, by the recurring payment collection system, responsive to the recurring payment being processed by the payment system, that the recurring payment has been made.

14. The apparatus of claim 13, wherein the digital wallet provides the QR code to a merchant website application executing on the computing device of the customer.

15. The apparatus of claim 13, wherein the instructions to obtain the QR code is responsive to the customer accessing a merchant app on the customer device in response to receiving the notification and wherein the QR code is posted on the merchant app for the customer's utilization.

16. The apparatus of claim 13, wherein the recurring payment is established as part of an initial payment.

17. The apparatus of claim 13, wherein the recurring payment collection system sends a notification to the customer when the payment has been processed.

18. The apparatus of claim 13, wherein the notification is one of a Short Message Service (SMS) message, a Multimedia Messaging Service (MMS) message, or an email message.

\* \* \* \* \*